(12) United States Patent
Nakatsutsumi et al.

(10) Patent No.: US 11,876,253 B2
(45) Date of Patent: Jan. 16, 2024

(54) ALKALI DRY BATTERY COMPRISING ELECTROLYTE INCLUDING SULFONYL GROUP-CONTAINING ANION

(71) Applicant: Panasonic Intellectual Property Management Co., Ltd., Osaka (JP)

(72) Inventors: Takayuki Nakatsutsumi, Osaka (JP); Yasuyuki Kusumoto, Hyogo (JP); Yasufumi Takahashi, Hyogo (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 157 days.

(21) Appl. No.: 17/427,860

(22) PCT Filed: Oct. 25, 2019

(86) PCT No.: PCT/JP2019/042043
§ 371 (c)(1),
(2) Date: Aug. 2, 2021

(87) PCT Pub. No.: WO2020/166138
PCT Pub. Date: Aug. 20, 2020

(65) Prior Publication Data
US 2022/0115676 A1    Apr. 14, 2022

(30) Foreign Application Priority Data

Feb. 13, 2019   (JP) .................................. 2019-023833

(51) Int. Cl.
*H01M 6/06*     (2006.01)
*H01M 4/24*     (2006.01)
*H01M 10/26*    (2006.01)

(52) U.S. Cl.
CPC ............. *H01M 6/06* (2013.01); *H01M 4/244* (2013.01); *H01M 10/26* (2013.01); *H01M 2300/0014* (2013.01)

(58) Field of Classification Search
CPC ........ H01M 6/06; H01M 4/244; H01M 10/26; H01M 2300/0014
See application file for complete search history.

(56) References Cited

U.S. PATENT DOCUMENTS

2017/0222232 A1   8/2017  Lockett et al.
2018/0190997 A1   7/2018  Takahashi

FOREIGN PATENT DOCUMENTS

CN      103748710 A  *  4/2014  ........ H01M 10/0565
CN      107851809 A     3/2018
(Continued)

OTHER PUBLICATIONS

EPO machine generated English translation of CN-103748710-A (Year: 2014).*

(Continued)

*Primary Examiner* — Christopher P Domone
*Assistant Examiner* — Kimberly Wyluda
(74) *Attorney, Agent, or Firm* — WHDA, LLP

(57) ABSTRACT

An alkaline dry battery, including: a positive electrode, a negative electrode, a separator disposed between the positive electrode and the negative electrode, and an alkaline electrolyte. The positive electrode includes a manganese dioxide, the negative electrode includes zinc and/or a zinc alloy, and the alkaline electrolyte includes at least one sulfonyl group-containing anion selected from the group consisting of a bis(perfluoroalkylsulfonyl)imide anion, a bis(fluorosulfonyl)imide anion, and a fluorosulfonate anion.

3 Claims, 1 Drawing Sheet

(56) References Cited

FOREIGN PATENT DOCUMENTS

| | | | |
|---|---|---|---|
| JP | 2-270264 A | 11/1990 |
| JP | 2-270265 A | 11/1990 |
| JP | H09-022707 A | 1/1997 |
| JP | 2005-174560 A | 6/2005 |
| JP | 2015-2153 A | 1/2015 |
| JP | 2017-188273 A | 10/2017 |
| JP | 2017-188274 A | 10/2017 |

OTHER PUBLICATIONS

International Search Report dated Jan. 28, 2020, issued in counterpart International Application No. PCT/JP2019/042043. (3 pages).
English Translation of Chinese Search Report dated Sep. 28, 2023 for the related Chinese Patent Application No. 201980073904.8.

* cited by examiner

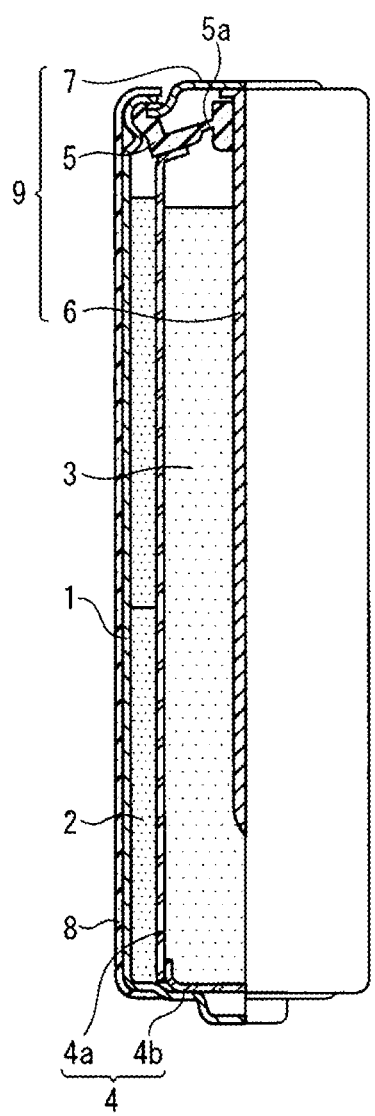

ALKALI DRY BATTERY COMPRISING ELECTROLYTE INCLUDING SULFONYL GROUP-CONTAINING ANION

TECHNICAL FIELD

The present invention relates to an improvement of an alkaline electrolyte of an alkaline dry battery.

BACKGROUND ART

Alkaline dry batteries (alkaline manganese dry batteries) have been widely used because of their large capacity as compared to those of manganese dry batteries and a large current that can be taken out therefrom. An alkaline dry battery includes a positive electrode, a negative electrode, a separator disposed between the positive electrode and the negative electrode, and an alkaline electrolyte. The positive electrode includes a manganese dioxide as a positive electrode active material, and the negative electrode includes zinc and/or a zinc alloy as a negative electrode active material.

Patent Literature 1 discloses that a battery including a zinc negative electrode, a cadmium negative electrode, or a lithium negative electrode can include an electrolyte (aqueous electrolyte) prepared by using water alone as an electrolyte raw material, or an electrolyte prepared by using water added with an organic solvent, as an electrolyte raw material. The electrolyte may be an organic solvent-based electrolyte, and the electrolytic material of the organic solvent-based electrolyte may be $LiPF_6$, $LiBF_4$, $LiB(CN)_4$, lithium bis(fluorosulfonyl) imide (LiFSI), lithium bis(trifluoromethylsulfonyl) imide (LiTFSI), and the like. Patent Literature 1 relates to a secondary battery in which a short circuit between the electrodes may occur due to dendrite growth.

CITATION LIST

Patent Literature

[PTL 1] Japanese Laid-Open Patent Publication No. 2017-188274

SUMMARY OF INVENTION

When an alkaline dry battery is stored at a high temperature (e.g., 60° C.), the corrosion of the zinc is facilitated at the negative electrode, and the internal resistance may increase.

In view of the above, one aspect of the present invention relates to an alkaline dry battery, including: a positive electrode; a negative electrode; a separator disposed between the positive electrode and the negative electrode; and an alkaline electrolyte, the positive electrode including a manganese dioxide, the negative electrode including zinc and/or a zinc alloy, the alkaline electrolyte including at least one sulfonyl group-containing anion selected from the group consisting of a bis(perfluoroalkylsulfonyl)imide anion, a bis(fluorosulfonyl)imide anion, and a fluorosulfonate anion.

According to the present invention, the rise in the internal resistance can be suppressed even when an alkaline dry battery is stored at a high temperature (e.g., 60° C.).

BRIEF DESCRIPTION OF DRAWING

FIG. 1 A front view, partially shown in cross section, of an alkaline dry battery in one embodiment of the present invention.

DESCRIPTION OF EMBODIMENTS

An alkaline dry battery according to an embodiment of the present invention includes a positive electrode, a negative electrode, a separator disposed between the positive electrode and the negative electrode, and an alkaline electrolyte (hereinafter sometimes simply referred to as an electrolyte). The positive electrode includes a manganese dioxide as a positive electrode active material, and the negative electrode including zinc and/or a zinc alloy, as a negative electrode active material. The electrolyte is impregnated in the positive electrode, the negative electrode, and the separator.

The alkaline electrolyte includes water as a solvent, and as a solute, a salt having an anion and a cation. At least part of the salt is an alkaline component being a main component, and at least part of the rest of the salt is an additive component having a sulfonyl group-containing anion. In other words, the electrolyte is an aqueous alkaline solution containing water, an alkaline component, and an additive component. The alkaline component is, for example, a potassium hydroxide. The concentration of the potassium hydroxide in the electrolyte is preferably 30 mass % to 50 mass %.

The anion includes at least one sulfonyl group-containing anion selected from the group consisting of a bis(perfluoroalkylsulfonyl)imide anion, a bis(fluorosulfonyl)imide anion (hereinafter sometimes referred to as an FSI anion), and a fluorosulfonate anion. In particular, a bis(perfluoroalkylsulfonyl)imide anion is highly effective in reducing the internal resistance.

Two perfluoroalkyl groups of the bis(perfluoroalkylsulfonyl)imide anion each have, for example, one to three carbon atoms. The two perfluoroalkyl groups may be the same or different from each other. Examples of the perfluoroalkyl group include a trifluoromethyl group, a pentafluoroethyl group, and a heptafluoropropyl group.

Examples of the bis(perfluoroalkylsulfonyl)imide anion include a bis(trifluoromethylsulfonyl)imide anion (hereinafter sometimes referred to as a TFSI anion), a bis(pentafluoroethylsulfonyl)imide anion (hereinafter sometimes referred to as a BETI anion), and a trifluoromethylsulfonyl pentafluoroethylsulfonyl imide anion.

The alkaline electrolyte can include, as a cation constituting the salt, at least one selected from the group consisting of potassium, magnesium, calcium, lithium, sodium, and cesium. In particular, at least one selected from the group consisting of potassium, magnesium, sodium, and calcium is desirable in terms of their inexpensive price.

In the negative electrode, the zinc and/or the zinc alloy is in a particle form and dispersed in the electrolyte. In the following, particles of the zinc and/or the zinc alloy are referred to as zinc-containing particles. Usually, the electrolyte is added with a gelling agent, and the gelling agent is present in the form of a gel swollen with the electrolyte. A composite of the electrolyte in a gel form and the zinc-containing particles dispersed therein is hereinafter sometimes referred to as a gel negative electrode. The zinc-containing particles are surrounded by an abundance of the electrolyte in a gel form.

When an alkaline dry battery is stored at a high temperature (e.g., 60° C.), the corrosion of the zinc-containing particles in the negative electrode tends to be facilitated. To be specific, the zinc reacts with the alkaline electrolyte, which may lead to the leaching of zinc ions into the electrolyte, or to the deposition of zinc oxide or zinc hydroxide on the surface of the zinc-containing particles.

To address this, by containing a sulfonyl group-containing anion in the alkaline electrolyte, the corrosion reaction of the zinc-containing particles can be suppressed, and the rise in the internal resistance can be suppressed. Although the corrosion suppression mechanism is not clear in details, the sulfonyl group-containing anion is reductively decomposed on the surface of the zinc-containing particles, presumably forming a protective surface film derived from a decomposition product on the zinc-containing particles, which can suppress the corrosion reaction of the zinc-containing particles.

The fluorosulfonate anion can be produced in the electrolyte as a decomposition product of the bis(perfluoroalkylsulfonyl)imide anion or the FSI anion. The presence of the fluorosulfonate anion in the alkaline electrolyte indicates that the electrolyte contains a sulfonyl group-containing anion other than the fluorosulfonate anion, and the zinc-containing particles have a protective surface film formed thereon.

The concentration of the sulfonyl group-containing anion in the alkaline electrolyte is, for example, $1\times10^{-5}$ mol/L or more and $5\times10^{-1}$ mol/L or less, and may be $1\times10^{-3}$ mol/L or more and $5\times10^{-2}$ mol/L or less. By containing the sulfonyl group-containing anion in the electrolyte in the concentration range as above, the thickness or strength of the protective surface film formed on the zinc-containing particles becomes favorable, and the corrosion reaction of the zinc-containing particles can be more effectively suppressed, and moreover, the resistance of the protective surface film itself can be suppressed as low as possible.

The sulfonyl group-containing anion may be partially present as an acid in which the anion is bonded to hydrogen, or present as a salt, in the alkaline electrolyte. In other words, the sulfonyl group-containing anion amount is calculated as a sum of the amounts of the anion, an acid form of the anion to which hydrogen is bonded, and a salt of the anion with a cation bonded thereto.

The sulfonyl group-containing anion amount in the alkaline electrolyte can be measured by subjecting the electrolyte to gas chromatography mass spectrometry (GC-MS), nuclear magnetic resonance spectrometry (NMR), ion chromatography, or the like.

To the alkaline electrolyte, a zinc oxide may be added. A preferable concentration of the zinc oxide in the electrolyte is, for example, 1 mass % to 5 mass %. By containing zinc ions in the alkaline electrolyte in advance, the reaction that causes zinc ions to leach out from the zinc-containing particles into the electrolyte can be suppressed.

The alkaline electrolyte may contain a surfactant in order to, for example, enhance the dispersibility of the zinc-containing particles. The surfactant is a molecule having a molecular weight of, for example, exceeding 200, and is usually different from the solvent of the electrolyte. Examples of the surfactant include a polyoxyalkylene group-containing compound and a phosphoric acid ester. The content of the surfactant in the electrolyte is usually 0.5 mass % or less, and may be 0.2 mass % or less.

The solvent of the alkaline electrolyte is water, and desirably does not include a low-molecular weight organic compound used as an organic solvent in a non-aqueous battery and having a molecular weight of 120 or less (hereinafter sometimes referred to as a low-molecular weight organic compound or an organic solvent). The low-molecular weight organic compound can lower the open-circuit voltage (OCV) of the positive electrode. Therefore, even when the alkaline electrolyte slightly contains the low-molecular weight organic compound, the concentration of the low-molecular weight organic compound in the alkaline electrolyte is desirably set to below 0.1 mass %. More desirably, the alkaline electrolyte is substantially free of the low-molecular weight organic compound. Specifically, the content of the low-molecular weight organic compound in the alkaline electrolyte may be 50 ppm by mass or less, and may be below the detection limit.

Specific examples of the low-molecular weight organic compound that is desirably excluded from the alkaline electrolyte include ethylene carbonate, propylene carbonate, dimethyl carbonate, diethyl carbonate, γ-butyrolactone, dimethoxymethane, diethoxymethane, dimethoxyethane, tetrahydrofuran, methyltetrahydrofuran, diethoxyethane, dimethylsulfoxide, sulfolane, acetonitrile, benzonitrile, ionic liquid, fluorine-containing carbonates, fluorine-containing ethers, polyethylene glycols, and fluorine-containing polyethylene glycols. Specifically, the total concentration of these is desirably set to below 0.1 mass %, and more preferably set to 50 ppm or less, or below the detection limit.

On the other hand, the alkaline electrolyte may contain a very small amount of one or more kinds of organic components which are distinguishable from an organic solvent and solid at room temperature (25° C. to 40° C.). Examples of such organic components include an aromatic compound, such as terephthalic acid.

The alkaline dry battery according to an embodiment of the present invention may be a cylindrical battery, a coin battery, or the like, but is not limited thereto.

A detailed description will be given below of an alkaline dry battery according to the present embodiment, with reference to the drawing. The present invention, however, is not limited to the below. Modification can be made as appropriate without departure from the scope in which the effect of the present invention can be exerted. Furthermore, any combination with another embodiment is possible.

FIG. 1 is a front view of an example of an inside-out type cylindrical alkaline dry battery according to one embodiment of the present invention, with one half side shown in cross-section. An alkaline dry battery 10 has a bottomed cylindrical battery case 1 serving as a positive electrode terminal, in which a hollow cylindrical positive electrode 2, a gel negative electrode 3 disposed within the hollow of the positive electrode 2, a separator 4 disposed therebetween, and the above-described electrolyte (not shown) are housed.

The positive electrode 2 is disposed in contact with the inner wall of the battery case 1. The gel negative electrode 3 is packed in the hollow of the positive electrode 2, with the separator 4 interposed therebetween.

The separator 4 is constituted of a cylindrically-shaped separator 4a and a bottom paper 4b. The separator 4a is disposed along the inner surface of the hollow of the positive electrode 2, to provide insulation between the positive electrode 2 and the negative electrode 3. The bottom paper 4b is disposed at the bottom of the hollow of the positive electrode 2, to provide insulation between the negative electrode 3 and the battery case 1.

The opening of the battery case 1 is sealed with a sealing unit 9. The sealing unit 9 includes a gasket 5, a negative electrode terminal plate 7 serving as a negative electrode terminal, and a negative electrode current collector 6. The negative electrode current collector 6 is shaped like a nail having a head and a shank, and the shank is passed through a through-hole provided in the center cylindrical portion of the gasket 5 and inserted into the gel negative electrode 3. The head of the negative electrode current collector 6 is welded to the flat portion at the center of the negative electrode terminal plate 7. The opening end of the battery case 1 is crimped onto the flange at the circumference of the negative electrode terminal plate 7, via the peripheral end portion of the gasket 5. The outer surface of the battery case 1 is wrapped with an outer label 8.

The negative electrode current collector 6 contains, for example, copper, and may be made of an alloy containing copper and zinc, such as brass. The negative electrode current collector may be plated with tin or the like, if necessary.

A detailed description will be given below of main constituent parts other than the electrolyte of the alkaline dry battery.

(Negative Electrode)

The gel negative electrode is, for example, a mixture of a negative electrode active material, a gelling agent, and an electrolyte. The negative electrode active material may be zinc and/or a zinc alloy in a particle form (i.e., zinc-containing particles). The zinc alloy may contain at least one selected from the group consisting of indium, bismuth, and aluminum, in view of the corrosion resistance. The indium content in the zinc alloy is, for example, 0.01 mass % to 0.1 mass %, and the bismuth content is, for example, 0.003 mass % to 0.02 mass %. The aluminum content in the zinc alloy is, for example, 0.001 mass % to 0.03 mass %. In view of the corrosion resistance, the element(s) other than zinc preferably occupies 0.025 mass % to 0.08 mass % of the zinc alloy.

The average particle diameter (D50) of the zinc-containing particles is, for example, 100 μm to 200 μm, preferably 110 μm to 160 μm, in view of the packability of the negative electrode and the diffusibility of the electrolyte in the negative electrode. In the present specification, the average particle diameter (D50) refers to a median diameter at 50% cumulative volume in a volumetric particle size distribution. The average particle diameter can be measured by, for example, using a laser diffraction/scattering type particle size distribution analyzer.

The gelling agent may be, for example, a water-absorbent polymer. Examples of the gelling agent include polyacrylic acid and sodium polyacrylate. The amount of the gelling agent is, for example, 0.5 parts by mass to 2.5 parts by mass per 100 parts by mass of the negative electrode active material or the zinc-containing particles.

The surfactant, the aromatic compound, and the like added in the electrolyte are used for the viscosity adjustment of the gel negative electrode and other purposes. In view of dispersing the surfactant or the aromatic compound uniformly in the negative electrode, the surfactant or the aromatic compound is added in advance in the electrolyte used for the production of the negative electrode.

In order to improve the corrosion resistance, a compound containing a metal with high hydrogen overvoltage, such as indium and bismuth, may be added as appropriate in the negative electrode. Also, a very small amount of silicic acid or a silicic acid compound may be added as appropriate in the negative electrode.

(Positive Electrode)

The positive electrode can be obtained by, for example, mixing a positive electrode active material, an electrically conductive agent, and an electrolyte. The positive electrode may further contain a binder, if necessary. The positive electrode can be formed by, for example, compression-molding a positive electrode material mixture including a positive electrode active material, an electrically conductive agent, an electrolyte, and if necessary, a binder, into a pellet shape. Pellets thus formed are inserted into a battery case, which may be followed by secondary compression to bring them into close contact with the inner wall of the battery case.

The positive electrode active material may be a particulate manganese dioxide. The manganese dioxide is preferably an electrolytic manganese dioxide. The manganese dioxide has a crystal structure, such as an α-type, a β-type, a γ-type, a δ-type, an ε-type, a η-type, a λ-type, and a ramsdellite-type crystal structure.

The average particle diameter (D50) of the manganese dioxide is, for example, 25 μm to 60 μm, in view of ensuring the packability of the positive electrode and the diffusibility of the electrolyte in the positive electrode.

In view of the moldability and the suppression of the positive electrode expansion, the BET specific surface area of the manganese dioxide may be in a rage of 20 $m^2$/g to 50 $m^2$/g. The BET specific surface area can be measured using, for example, a specific surface area meter by nitrogen adsorption method.

Examples of the conductive agent include carbon black, such as acetylene black, and an electrically conductive carbon material, such as graphite. The graphite may be natural graphite, artificial graphite, and the like. The conductive agent is, for example, in a powder form. The average particle diameter (D50) of the conductive agent is, for example, 3 μm to 20 μm.

The content of the conductive agent in the positive electrode relative to 100 parts by mass of the manganese dioxide may be, for example, 3 parts by mass to 10 parts by mass, and may be 5 parts by mass to 9 parts by mass.

A silver compound may be added in the positive electrode, in order to allow it to absorb the hydrogen generated inside the battery when the alkaline dry battery is charged by misuse.

(Separator)

The separator may be, for example, a nonwoven fabric mainly composed of fibers, or a microporous film made of resin. Examples of the material of the fibers include cellulose and polyvinyl alcohol. The nonwoven fabric may be formed by mixing cellulose fibers and polyvinyl alcohol fibers, and may be formed by mixing rayon fibers and polyvinyl alcohol fibers. The microporous film may be made of resin, such as cellophane and polyolefin. The thickness of the separator is, for example, 200 μm to 300 μm. When the separator is thin, a plurality of the separators may be stacked to have the thickness as above.

(Gasket)

The gasket is made of polyamide, polyethylene, polypropylene, or the like, and produced by, for example, injection molding. Particularly preferred are 6,10-nylon, 6,12-nylon, polypropylene, and the like, in terms of their good hydrogen permeability. The gasket is usually provided with a thin-walled portion for explosion-proof purpose. A gasket 5 of FIG. 1 has an annular thin-walled portion 5a.

The present invention will be more specifically described below with reference to Examples and Comparative Examples. It is to be noted, however, the present invention is not limited to the following Examples.

Examples 1 to 8

AA-size cylindrical alkaline dry batteries (LR6) as illustrated in FIG. 1 were produced in the below-described procedures (1) to (3).

(1) Production of Positive Electrode

Electrolytic manganese dioxide powder (average particle diameter (D50): 35 μm) serving as a positive electrode active material was mixed with graphite powder (average particle diameter (D50): 8 μm) serving as an electrically conductive agent, to give a mixture. The mass ratio of the electrolytic manganese dioxide powder to the graphite powder was set to 92.4:7.6. The electrolytic manganese dioxide powder used here had a specific surface area of 41 $m^2$/g. An electrolyte was added to the mixture to prepare a positive electrode material mixture, which was stirred sufficiently and, then, compression-molded into a flake form. The mass ratio of the mixture to the electrolyte was set to 100:1.5.

The electrolyte was prepared by adding a metal salt of a sulfonyl group-containing anion as shown in Table 1 to an aqueous alkaline solution containing potassium hydroxide (concentration: 33 mass %) and zinc oxide (concentration: 2 mass %). The content of the metal salt of the sulfonyl group-containing anion in the electrolyte was set to 0.5 mass %.

The flake form of the positive electrode material mixture was crushed into a granular form, and classified through a 10- to 100-mesh sieve. Then, 11 g of the resultant granules were compression-molded into a predetermined hollow cylindrical shape of 13.65 mm in outer diameter, to form a positive electrode pellet 2. Two pellets were produced.

(2) Production of Negative Electrode

Zinc alloy powder (average particle diameter (D50): 130 μm) serving as a negative electrode active material, an electrolyte, and a gelling agent were mixed, to give a gel negative electrode 3. The zinc alloy powder, the electrolyte, and the gelling agent were mixed in a mass ratio of 100:50:1. The electrolyte used here had the same composition as that used for the production of the positive electrode. The gelling agent used here was a mixture of a cross-linked branched polyacrylic acid and a highly cross-linked linear sodium polyacrylate. The zinc alloy used here was a zinc alloy containing 0.02 mass % of indium, 0.01 mass % of bismuth, and 0.005 mass % of aluminum.

(3) Assembling of Alkaline Dry Battery

Varniphite available from Nippon Graphite Industries, Ltd. was applied to the inner surface of a bottomed cylindrical battery case 1 (outer diameter: 13.80 mm, wall thickness of cylindrical portion: 0.15 mm, height: 50.3 mm) made of a nickel-plated steel sheet, to form a carbon coating having a thickness of about 10 μm. Next, two positive electrode pellets 2 (i.e., positive electrode 2) were inserted one on the other into the battery case 1 and then compressed, to bring them into close contact with the inner wall of the battery case 1. A bottomed cylindrical separator 4 was placed inside the positive electrode 2, and then, an electrolyte was injected thereto, to be impregnated into the separator 4. The electrolyte used here had the same composition as that used for the production of the positive electrode and the negative electrode. These were allowed to stand in this state for a predetermined period of time, to allow the electrolyte to permeate from the separator 4 into the positive electrode 2. Thereafter, 6 g of the gel negative electrode 3 was packed inside the separator 4.

The separator 4 was constituted of a cylindrically-shaped separator 4a and a bottom paper 4b. The separator was formed using a mixed nonwoven fabric (basis weight: 28 g/$m^2$) mainly composed of rayon fibers and polyvinyl alcohol fibers mixed in a mass ratio of 1:1. The thickness of the bottom paper 4b was 0.27 mm, and the separator 4a was constituted by winding a 0.09-mm-thick nonwoven fabric sheet in three layers.

A negative electrode current collector 6 was prepared by press-working a brass (Cu content: approx. 65 mass %, Zn content: approx. 35 mass %) into a nail shape, and plating its surface with tin. The diameter of the shank of the negative electrode current collector 6 was set to 1.15 mm. The head of the negative electrode current collector 6 was welded to a negative electrode terminal plate 7 made of a nickel-plated steel sheet. Then, the shank of the negative electrode current collector 6 was press-inserted into the through-hole provided at the center of a gasket 5 mainly composed of polyamide 6,12. In this way, a sealing unit 9 composed of the gasket 5, the negative electrode terminal plate 7, and the negative electrode current collector 6 was formed.

Next, the sealing unit 9 was placed at the opening of the battery case 1, and the shank of the negative electrode current collector 6 was inserted into the gel negative electrode 3. The opening end of the battery case 1 was crimped onto the periphery of the negative electrode terminal plate 7, with the gasket 5 interposed therebetween, to seal the opening of the battery case 1. The outside surface of the battery case 1 was wrapped with an outer label 8, and thus, alkaline dry batteries A1 to A8 respectively of Examples 1 to 8 were completed.

Comparative Example 1

An alkaline dry battery R1 of Comparative Example 1 was completed in the same manner as in the above Examples, except that no metal salt of a sulfonyl group-containing anion was added to the electrolyte.

[Evaluation]

The batteries produced in the above were subjected to an internal resistance measurement and a DSC pulse test in the initial stage. On the other hand, new batteries of the above Examples were stored at 60° C. for two weeks, and thereafter, the batteries were subjected to an internal resistance measurement and a DSC pulse test, under the same conditions as those for the initial stage. The number of the batteries tested was n=3. The average of the measured values of the three batteries is shown in Table 1. The ratio of the measured value after storage to that before storage is also shown as a change in percentage in Table 1.

The internal resistance of the battery was measured using a commercially available tester, by an AC constant current technique at 1 kHz. The DSC pulse test was performed as follows. In a 20° C. atmosphere, the battery was subjected to a cycle consisting of a discharge at a constant power of 650 mW for 28 seconds, and a subsequent pulse-discharge at a constant power of 1500 mW for two seconds. The number of cycles repeated until the lower limit voltage at the 1500 mW pulse discharge reached 1.05 V was measured. This discharge pattern was based on simulating the application to a digital still camera (DSC).

TABLE 1

| Evaluation | | Internal resistance (mΩ) | | | DSC pulse (number of cycles) | | |
|---|---|---|---|---|---|---|---|
| Battery | Salt | Before storage | After storage | Change in percentage (%) | Before storage | After storage | Change in percentage (%) |
| R1 | Without | 72 | 83 | +15 | 129 | 118 | −9 |
| A1 | Mg(TFSI)$_2$ | 78 | 76 | −3 | 127 | 130 | +2 |
| A2 | Ca(TFSI)$_2$ | 72 | 70 | −3 | 140 | 137 | −2 |
| A3 | LiTFSI | 71 | 72 | +1 | 139 | 139 | 0 |
| A4 | KTFSI | 70 | 71 | +1 | 140 | 142 | +1 |
| A5 | KFSI | 72 | 76 | +5 | 129 | 125 | −3 |
| A6 | CsTFSI | 77 | 78 | +1 | 127 | 125 | −2 |
| A7 | LiBETI | 70 | 68 | −3 | 140 | 141 | +1 |
| A8 | NaTFSI | 72 | 72 | 0 | 140 | 140 | 0 |

Next, the influence of ethylene carbonate (EC) on the electrolyte was checked. EC is a low-molecular weight organic compound typically used as an organic solvent of the electrolyte in a non-aqueous battery. Specifically, EC was added at a concentration of 0.5 mass % to the electrolyte of Example 3 including LiTFSI as a metal salt of a sulfonyl group-containing anion, to prepare a reference electrolyte R2.

On the other hand, a mixture containing 95 parts by mass of electrolytic manganese dioxide powder (average particle diameter (D50): 35 μm), 4.8 parts by mass of graphite powder (average particle diameter (D50): 8 μm), and 0.2 parts by mass of polytetrafluoroethylene (PTFE) was prepared, and the mixture was molded into a positive electrode pellet of 3.0 mm in thickness and ϕ9.2 mm in diameter.

Subsequently, the positive electrode pellet was immersed in the reference electrolyte R2, to measure the electric potential (OCV) of the positive electrode pellet versus a zinc wire reference electrode, at room temperature (25° C.). Thereafter, while immersed in a reference electrolyte R2 at 25° C., the positive electrode pellet was left to stand for one week, and again, the electric potential (OCV) of the positive electrode pellet versus a zinc wire reference electrode was measured. With respect to the electrolyte used in Example 3 (A3) and Comparative Example 1 (R1), too, the OCV was measured in a similar manner to the above. The results of the OCV measurement in the initial stage and after storage for one week are shown in Table 2.

TABLE 2

| Electrolyte | Salt | Organic solvent | Initial OCV (V) | OCV after one week (V) |
|---|---|---|---|---|
| R1 | Without | Without | 1.65 | 1.62 |
| A3 | LiTFSI | Without | 1.64 | 1.62 |
| R2 | LiTFSI | EC | 1.64 | 1.55 |

Table 2 shows that when a low-molecular weight organic compound is contained in the electrolyte, the open circuit voltage (OCV) of the positive electrode tends to be lowered.

INDUSTRIAL APPLICABILITY

The dry battery according to an embodiment of the present invention is suitably applicable, for example, as a power source of a portable audio device, a portable game player, a light, a toy, and the like.

REFERENCE SIGNS LIST 1 battery case
2 positive electrode
3 negative electrode
4 bottomed cylindrical separator
4a cylindrically-shaped separator
4b bottom paper
5 gasket
5a thin-walled portion
6 negative electrode current collector
7 negative electrode terminal plate
8 outer label
9 sealing unit
10 alkaline dry battery

The invention claimed is:

1. An alkaline dry battery, comprising:
    a positive electrode; a negative electrode; a separator disposed between the positive electrode and the negative electrode; and an alkaline electrolyte,
    the positive electrode including a manganese dioxide,
    the negative electrode including zinc and/or a zinc alloy,
    the alkaline electrolyte including at least one sulfonyl group-containing anion selected from the group consisting of a bis(perfluoroalkylsulfonyl)imide anion, a bis(fluorosulfonyl)imide anion, and a fluorosulfonate anion,
    wherein the alkaline electrolyte contains substantially no low-molecular weight organic compound having a molecular weight of 120 g/mol or less.

2. The alkaline dry battery according to claim 1, wherein the alkaline electrolyte includes at least one cation selected from the group consisting of potassium, magnesium, calcium, lithium, sodium, and cesium.

3. The alkaline dry battery according to claim 1, wherein a concentration of the sulfonyl group-containing anion in the alkaline electrolyte is $1.0 \times 10^{-5}$ mol/L or more and $5.0 \times 10^{-1}$ mol/L or less.

* * * * *